United States Patent [19]
Fukutomi et al.

[11] Patent Number: 4,695,089
[45] Date of Patent: Sep. 22, 1987

[54] UPPER BODY STRUCTURE OF AN OPEN-TOP VEHICLE

[75] Inventors: Hisao Fukutomi; Takeshi Konishi; Koji Kuraoka; Morio Umeda; Takanori Tuchiya; Yutaka Imura, all of Hiroshima, Japan

[73] Assignee: Mazda Motor Corporation, Hiroshima, Japan

[21] Appl. No.: 829,925

[22] Filed: Feb. 18, 1986

[30] Foreign Application Priority Data

Feb. 18, 1985 [JP] Japan .............................. 60-21398[U]
Apr. 27, 1985 [JP] Japan .................................. 60-91431
Apr. 27, 1985 [JP] Japan .................................. 60-91434

[51] Int. Cl.[4] .............................. B60J 7/11; B60J 7/12
[52] U.S. Cl. .................................... 296/107; 296/218; 280/756
[58] Field of Search ............... 296/107–109, 296/111, 112, 117, 118, 216, 218; 280/756

[56] References Cited

U.S. PATENT DOCUMENTS

| | | | |
|---|---|---|---|
| 1,360,579 | 11/1920 | Rapson | 296/117 |
| 2,869,923 | 1/1959 | Mulichak | 296/117 |
| 3,159,422 | 12/1964 | Lautenbach | 296/117 |
| 4,557,502 | 12/1985 | Scaduto et al. | 296/109 X |

FOREIGN PATENT DOCUMENTS

| | | | |
|---|---|---|---|
| 774412 | 12/1934 | France | 296/107 |
| 2086316 | 5/1982 | United Kingdom | 296/107 |

Primary Examiner—Dennis H. Pedder
Attorney, Agent, or Firm—Fleit, Jacobson, Cohn & Price

[57] ABSTRACT

An open-top vehicle body structure including a foldable hood and a linkage for extending and folding the hood. At each side, a reversible motor is provided for actuating the linkage. In order to synchronize the operation of the motors at the respective sides, a connecting rod or flexible shaft is provided and connects together the output shafts of the motor. The linkage includes a swingable pillar of an inverted U-shape having opposite leg portions mounted on the body section for swinging movement about a transverse extending horizontal axis. The hood is connected at a front edge portion to the swingable pillar and at a rear edge portion to a part of the body located rearwardly of the swingable pillar. A rigid roof panel is removably mounted between a swingable pillar and a front windshield. The rotation of the motors produces a swingable movement of the pillar. The linkage includes a first link having one end pivotably connected with the leg portion of the swingable pillar and a second link having one end pivotably connected with the other end of the first link. The other end of the second link is connected with an upward shaft of the motor.

9 Claims, 19 Drawing Figures

UPPER BODY STRUCTURE OF AN OPEN-TOP VEHICLE

BACKGROUND OF THE INVENTION

1. Field of the Invention

The present invention relates to a vehicle upper body structure, and more particularly to an upper body structure of an open-top type which includes a foldable hood structure for covering at least a rear upper part of the vehicle body.

2. Description of the Prior Art

Conventionally, among open-top type motor vehicles, a so-called convertible type has widely been known. Such type of motor vehicles include a foldable hood structure which is adapted to cover the roof and rear windshield portions but can be folded into the rear body section as desired to fully open the top portion of the vehicle body. The hood structure includes a foldable hood and a hood stretching linkage which is provided inside the hood and serves to stretch the hood when erected. Usually, the hood structure is moved into an extended position by hand through manual actuations of the linkage.

The British laid open patent application 2,086,316 discloses a new type of open-top vehicle body which includes a hoop member of a substantially U-shaped configuration having a pair of leg portions mounted on the vehicle body for swinging movement about an axis transverse to the body. A foldable hood is provided between the hoop member and the rear body section and a rigid roof panel is removably mounted in the roof portion between the hoop member and the front windshield. In the proposed body structure, the hoop member is manually actuated to move the hood between an extended position and a retracted position.

It should be noted, however, that such manual actuation is carried out at one side of the vehicle body so that the hoop member or the stretching linkage be twisted disturbing a uniform stretching of the hood structure. It is of course possible and advisable to provide power actuating means to drive the hoop member between these positions. In this instance, a pair of power actuators may be provided at the respective leg portions of the hoop member. However, even in this case, the pair of power actuators may not operate equally so that a twist may be produced in the hoop member or the hood stretching linkage.

SUMMARY OF THE INVENTION

It is therefore an object of the present invention to provide an open-top vehicle body structure in which the hood structure can be extended evenly.

Another object of the present invention is to provide an open-top vehicle body including hood stretching swingable member having a pair of leg portions mounted on the vehicle body and means for moving the leg portions in a synchronized manner.

A further object of the present invention is to provide an open-top vehicle body in which convenient means are provided for moving the hood structure between the extended and retracted positions.

According to the present invention, the above and other objects can be accomplished by an open-top vehicle body structure including a body section, foldable hood means adapted to cover at least a part of a roof portion of the body section, link means for supporting said hood means, said link means being movable between an extending position wherein the link means supports the hood means in an extended position and a retracted position wherein the link means allows the hood means to be folded, first operating means provided at one side portion of the body section for moving the link means at one side between the extending position and the retracted position, second operating means provided at the other side portion of the body section for moving the link means at the other side between the extending position and the retracted position, synchronizing means for synchronizing operations of said first and second operating means.

In a preferable aspect of the present invention, the first and second operating means are power actuating means such as electric motors. However, the operating means may be manual means for transmitting a manual actuating power to the link means.

The above and other objects and features of the present invention will become apparent from the following description of preferred embodiments taking reference to the accompanying drawings.

DESCRIPTION OF THE PREFERRED EMBODIMENTS

Figure 1A:
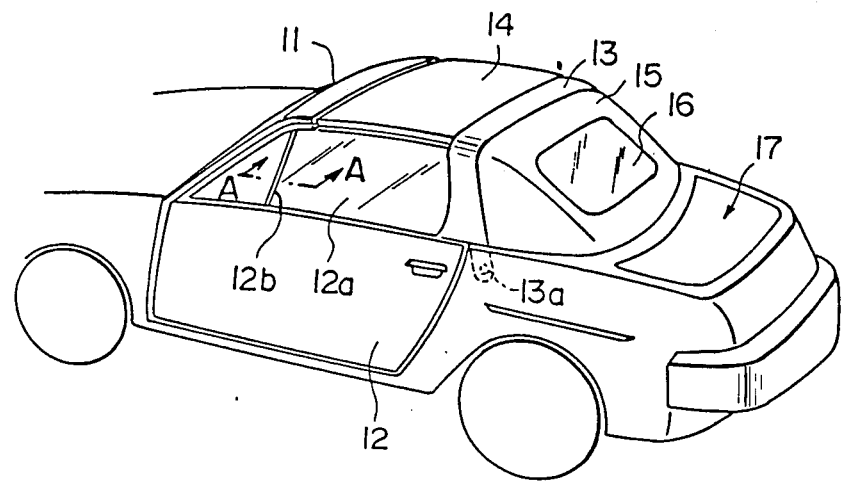
FIG. 1A is a perspective view showing an open-top vehicle body in accordance with one embodiment of the present invention with the hood structure in the extended position.

Referring to the drawings, particularly to FIG. 1A, the vehicle body shown therein includes a front windshield assembly 11, a pair of side doors 12 and a rear body section 17. On the rear body section 17, there is mounted a swingable pillar 13 of an inverted U-shape. The swingable pillar 13 is located rearward of the side doors 12 and has a pair of leg portions 13a mounted on the opposite side panels of the rear body section 17 for swingable movement from the erected position shown in FIG. 1A rearwardly to a retracted position shown in FIG. 1C.

Between the crest portion of the swingable pillar 13 in the erected position and the top edge portion of the front windshield assembly 11, there is mounted a roof panel 14 which is removable as desired. A rear hood 15 is provided between the swingable pillar 13 and the rear body section 17. The hood 15 has a transparent glass 16 in the central portion and attached at the front edge to the swingable pillar 13 and at the lower edge to the rear body section 17.

Figure 1B:
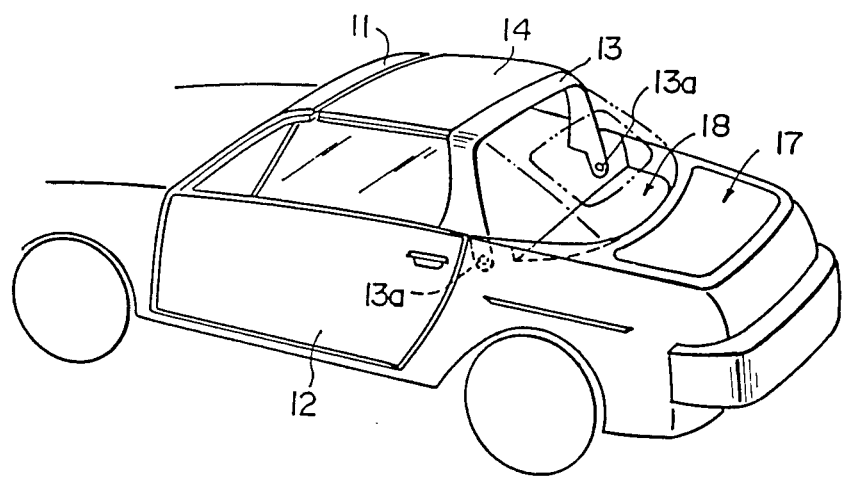
FIG. 1B is a perspective view of the body shown in FIG. 1A with the hood section removed to shown the interior.
Figure 1C:
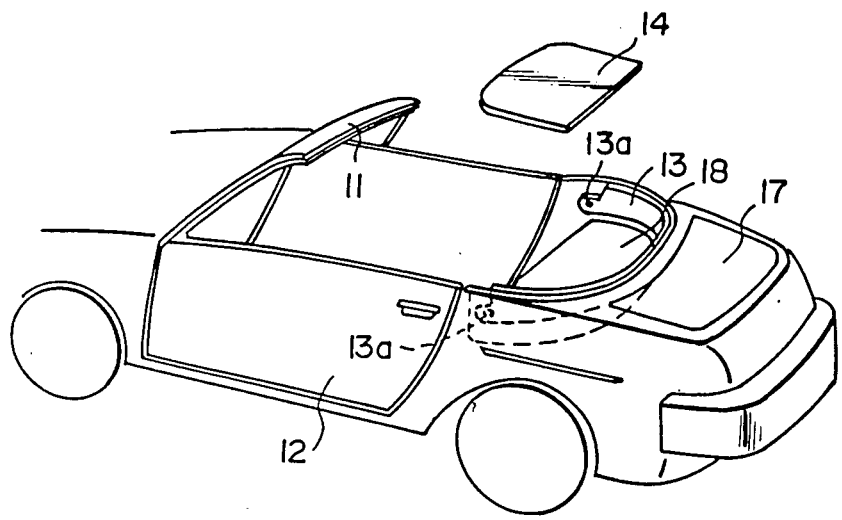
FIG. 1C is a perspective view showing the hood section in the retracted position.
Figure 2:
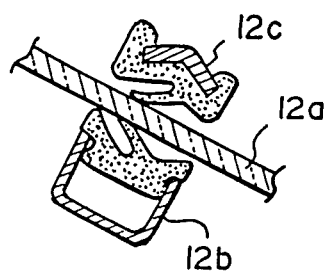
FIG. 2 is a sectional view taken along the line A—A in FIG. 1A.

Referring to FIG. 1B, it will be noted that the rear body section 17 is formed with a recess 18 for receiving the pillar 18 and the hood 15 when they are retracted. For moving the swingable pillar 13 to the retracted position, the roof panel 14 is at first removed and put in a suitable space such as a trunk room. Then, the pillar 13 is swingably moved rearwards so that the pillar 13 and the hood 15 are retracted beneath the belt line of the rear body section 17. In the illustrated embodiment, as shown in FIG. 2, window pillars 12b and 12c are provided at the opposite sides of the door glass 12a so that the door glass 12a can be firmly held when the pillar 13 is in the retracted position.

Figure 3:
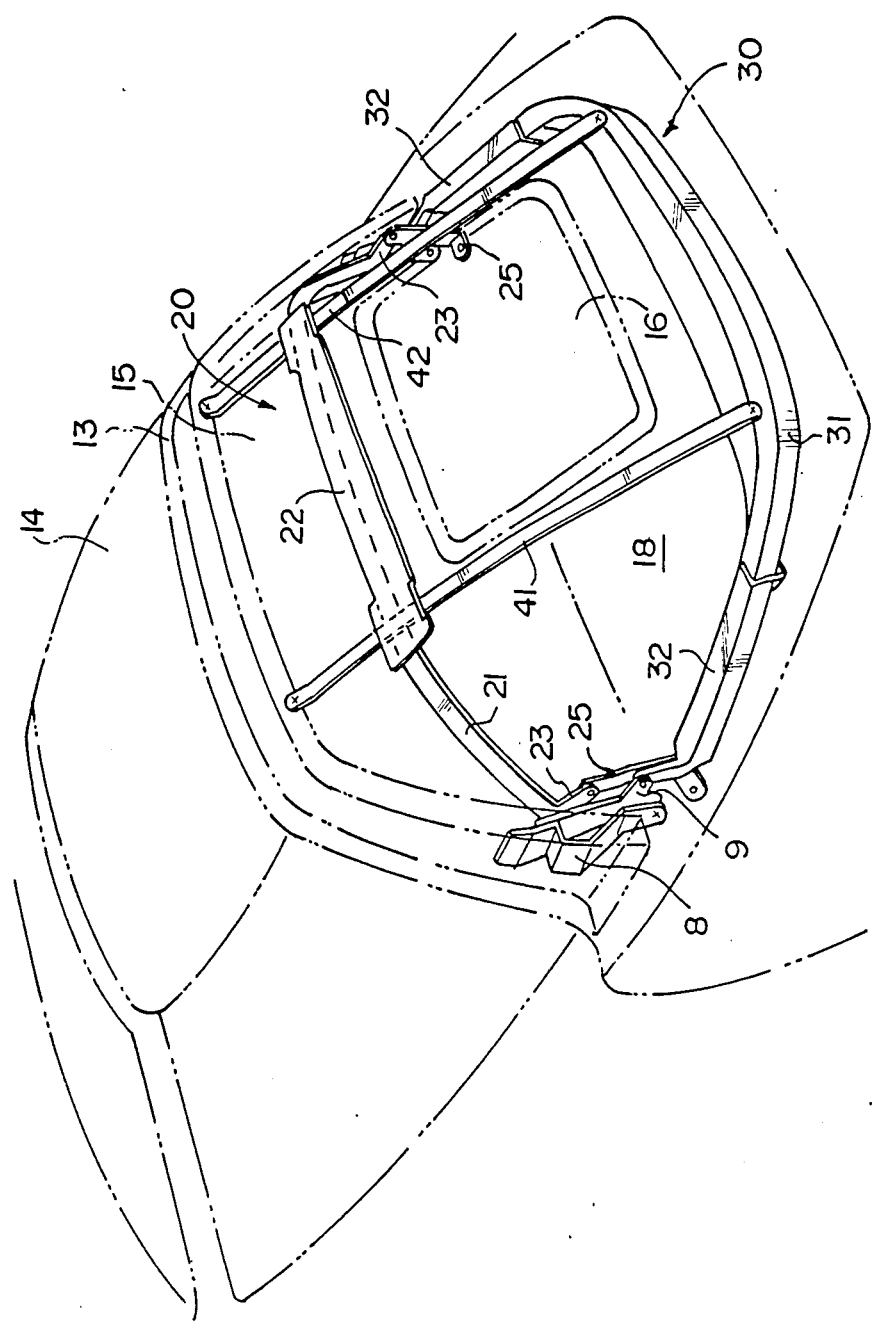
FIG. 3 is a perspective view showing the hood stretching linkage.

When the pillar 13 is in the erected positon to extend the hood 15, it is necessary to stretch the hood 15. For the purpose, a hood stretching linkage is provided inside the hood 15 as shown in FIG. 3. The linkage includes an upper stretching link assembly 20 having an upper link 21 of a substantially inverted U-shape. The link 21 is provided at the central portion with a stretching bar 22 adapted to be engaged with the inner surface of the hood 15 between the pillar 13 and the transparent glass 16. The linkage further includes a peripheral stretching link assembly 30 adapted for engagement with the inner surface of the hood 15 at the lower side portions and the lower rear portion thereof. A pair of flexible bands 41 and 42 are provided to extend between the pillar 13 and the peripheral hood stretching link 30. Each of the bands 41 and 42 is connected at the front end with the pillar 13 and passed between the link 21 and the stretching bar 22 to be connected at the rear end to the peripheral stretching link assembly 30.

The upper link 21 has opposite leg portions 23 which are pivotably mounted on the pillar 13. The leg portion 23 is formed with a rearwardly projecting lug which is pivotably connected with an upper end of a lower link 25 which is in turn pivotably mounted at the lower end on the rear body section 17. The link assembly 30 includes a rear link 31 of a substantially U-shaped configuration and a pair of front links 32 having rear ends pivotably connected with the opposite ends of the rear link 31. The front ends of the front links 32 are pivotably connected with the pillar 13. A first plate 8 and a second plate 9 are provided at each leg portion of the pillar 13 for the purpose of reinforcing the connection between the pillar 13 and the upper link 21 and the connection between the pillar 13 and the front link 32.

Figure 4:
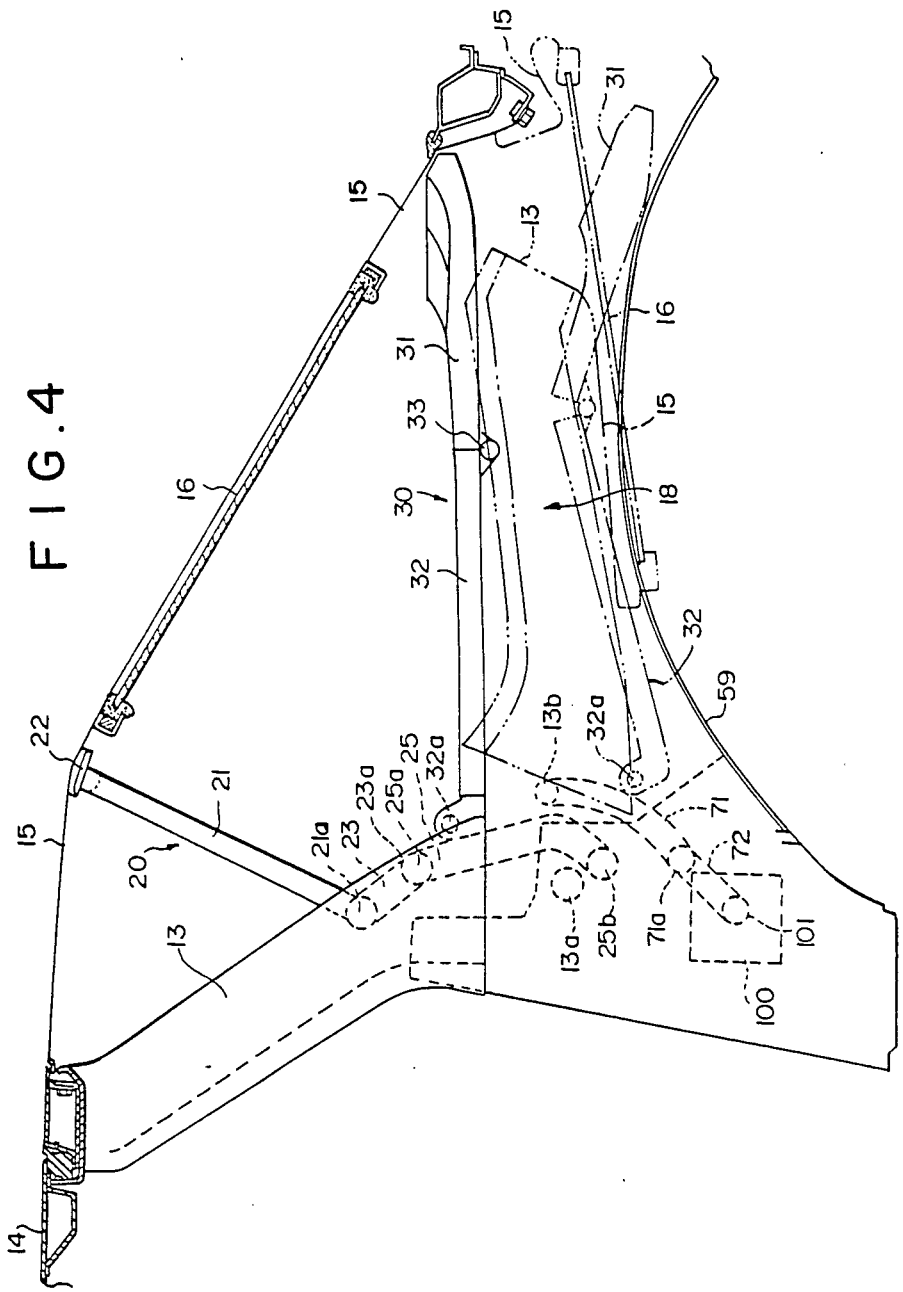
FIG. 4 is a side view of the linkage.
Figure 5:
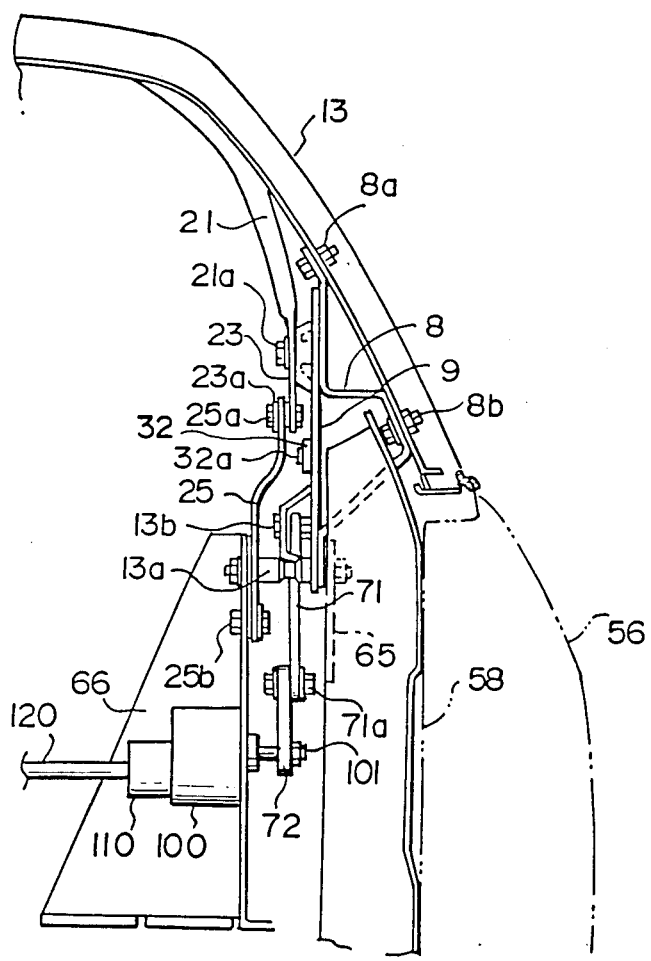
FIG. 5 is a front view of the linkage.

Referring now to FIG. 5, it will be noted that the plate 8 is secured to the pillar 13 by means of bolts 8a and 8b and the plate 9 is welded to the plate 8. The lower ends of the plates 8 and 9 are mounted pivotably by means of a pivot shaft 13a on brackets 65 and 66 which are provided on the rear body section 17. Thus, the pillar 13 is swingable about the pivot shaft 13a. In FIG. 4, the pivot shaft 13a is shown by a dotted line. On the plate 9, there is provided a pivot shaft 13b which is located rearward the shaft 13a. A first link 71 is mounted at one end on the pivot shaft 13b, the other end 71a of the first link 71 being connected with one end of a second link 72 which is in turn secured at the other end to an output shaft 101 of a gear box 100. As shown in FIG. 5, the gear box 100 is connected with a motor 110 so that the rotation of the motor 110 is transmitted through the gear box 100 to the second link 72. The movement of the second link 72 is then transmitted through the first link 71 to the pillar 13 to cause a swingable movement of the pillar 13 about the pivot shaft 13a. The aforementioned mechanism is provided at each leg portion of the pillar 13. In order to synchronize the operations of the motors 110 at the respective sides of the body section, the output shafts of the motors 110 are connected by a rod or a flexible shaft 120.

In the extended position of the hood 15, the upper stretching link assembly 20 functions to stretch the hood 15 by having the stretching bar 22 engaged with the hood between the pillar 13 and the glass 16. Therefore, the front portion of the hood 15 provides a continuous contour with respect to the roof panel 14. The rear view is therefore ensured through the glass 16. Since a sufficient length can be provided in the front portion of the hood 15 for folding the hood 15 in the space 18, the glass 16 can possess a substantial part of the rear portion of the hood to ensure an adequate rear view.

As shown in FIGS. 4 and 5, the upper link 21 is mounted pivotably at the lower end portion of each leg 23 by means of a pivot pin 21a. The rearwardly extending lug of the leg portion is pivotably connected with the upper end of the lower link 25 by means of a pivot pin 25a. The lower end of the lower link 25 is pivotably mounted on the bracket 66 by means of a pivot pin 25b.

The front end of each front link 32 is pivotably connected with the plate 9 by means of a pivot pin 32a so that the peripheral stretching link assembly 30 is brought into engagement with the lower side and rear portions of the hood 15 to stretch the same when the pillar 13 is in the erected position. It will be understood that the link assemblies 20 and 30 are both mounted on the plate 9 so that the link assemblies 20 and 30 can be received in the recess 18 when the pillar 13 is moved to the retracted position.

Figure 6:
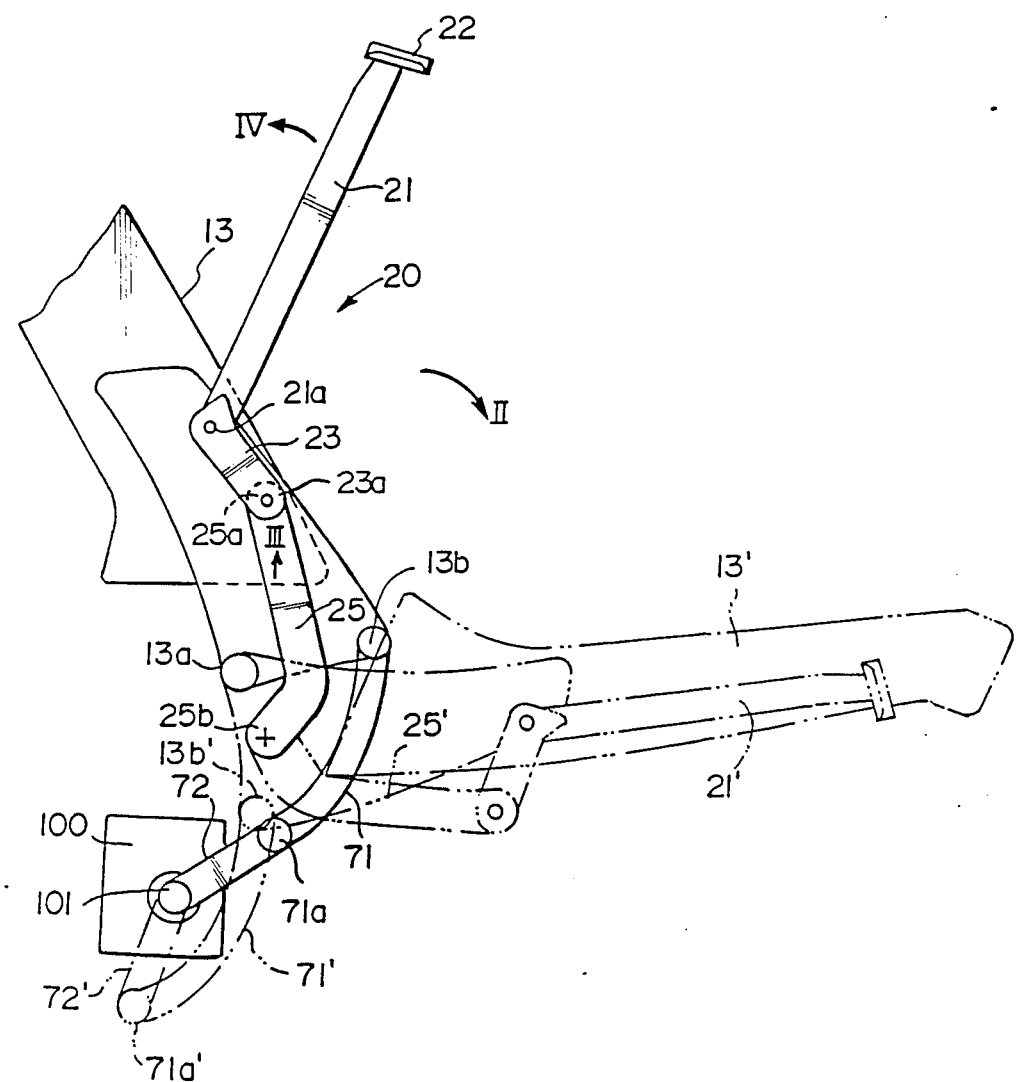
FIG. 6 is an enlarged view of the upper hood stretching linkage.

Referring to FIG. 6, the pillar 13 and the upper stretching link assembly 20 are shown in the erected position by solid lines. When the motor 110 is energized in this position to rotate the output shaft 101 of the gear box 100 in a clockwise direction, the pillar 13 is swung rearward about the pivot shaft 13a as shown by an arrow II. The upper link 21 is then moved together with the pillar 13. At the same time, the lower link 25 is swung rearward about the pivot pin 25b. *Since the pivot pin is located below the pivot shaft 13a*, the movement of the lower link 25 is such that it tends to push the lug on the upper link 21 upward as shown by an arrow III. Thus, the upper link 21 is folded about the pivot pin 21a toward the pillar 13 as shown by an arrow IV. It will therefore be understood that the upper link 21 is completely folded in the pillar 13 when the pillar 13 is retracted in the recess 18 as shown by phantom lines with primed reference numerals.

Figure 7:
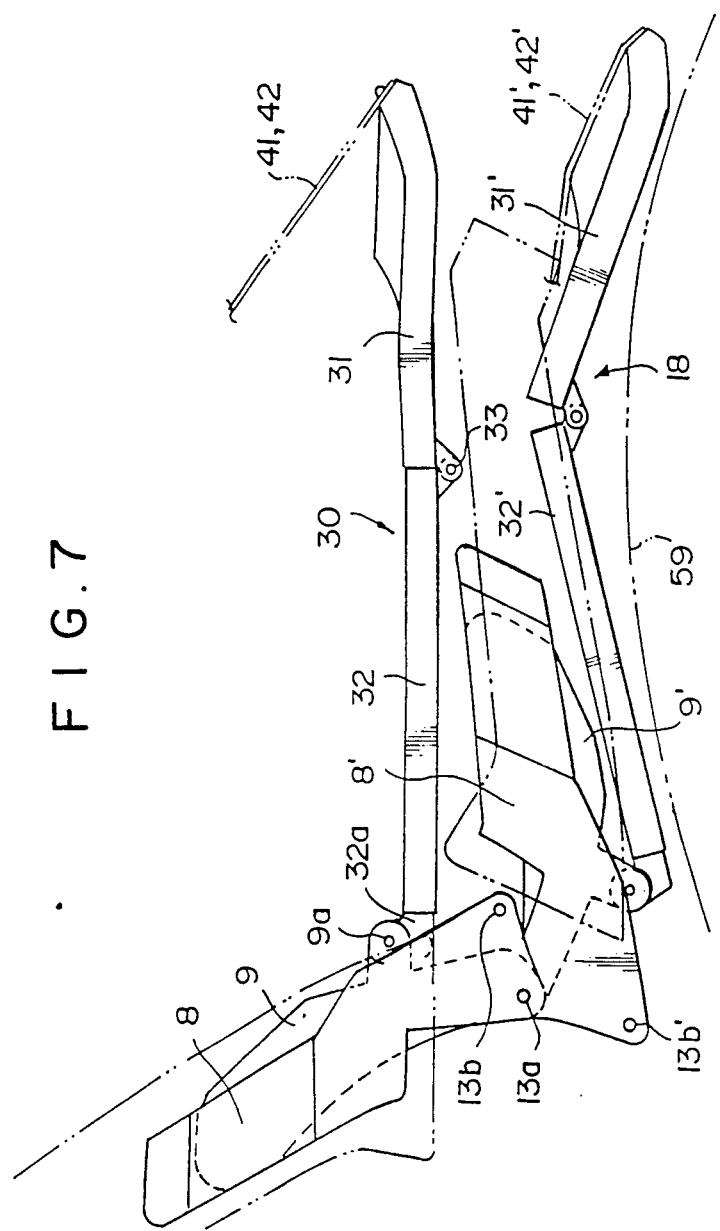
FIG. 7 is an enlarged view of the peripheral hood stretching linkage.

Referring to FIG. 7, the link assembly 30 extends substantially horizontally when the pillar 13 is in the erected positio as shown by solid lines. When the pillar 13 is swung rearward from this position, the plates 8 and 9 are moved to the positions shown by references numerals 8' and 9' to be received in the recess 18. The rear link 31 and the front links 32 are therefore received by the recess 18. The links 31 and 32 can lie along the contour of a tire house 59 by being pivoted about the pin 33.

Figure 8:
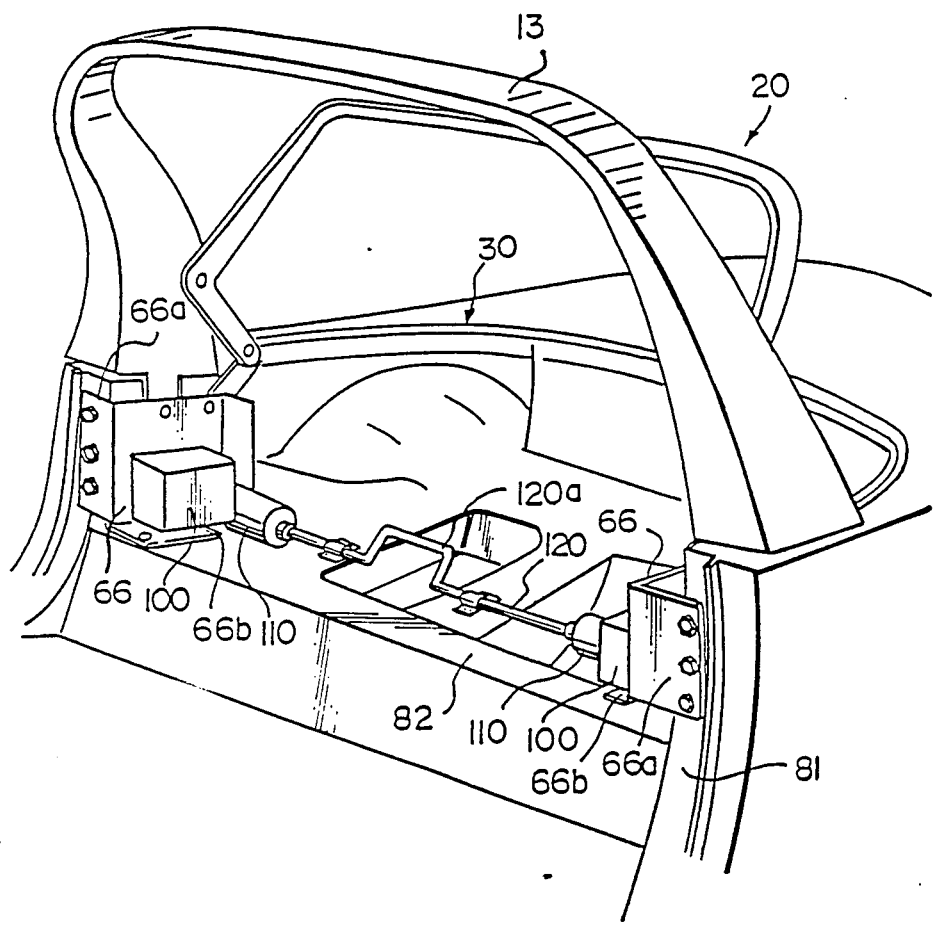
FIG. 8 is perspective view of the mechanism for moving the swingable member.
Figure 9A:
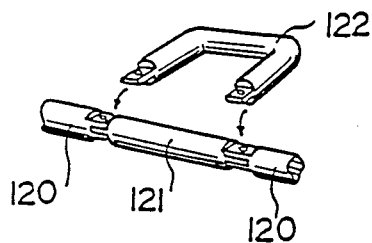
FIG. 9A is an exploded perspective view showing one modification.
Figure 9B:
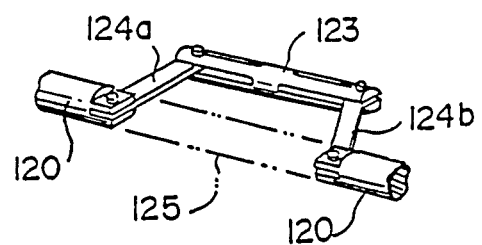
FIG. 9B is a perspective view showing another modification.

Referring to FIG. 8, it will be noted that the rod 120 connecting the output shafts of the motors 110 together is formed at the central portion with a crank portion 120a which provides a manually actuating handle. It is therefore possible in this embodiment to rotate the rod 120 by actuating the crank portion 120 to thereby move the pillar 13 and the associated linkages. In the embodiment shown in FIG. 9A, the rod 120 is divided into two parts which are removably connected together by means of a connecting rod 121. In case of a failure of the motor 110, the connecting rod 121 is substituted by a crank 122 so that the rod 120 can be manually actuated. FIG. 9B shows an example of a foldable crank mechanism which includes a handle rod 123 and a pair of links 124a and 124b connecting the opposite ends of the handle rod 123 to the ends of the rods 120 in a manner that they can be brought into a straight position s shown by phantom lines 125 but can be extended in the crank configuration as shown by solid lines.

Figure 10A:
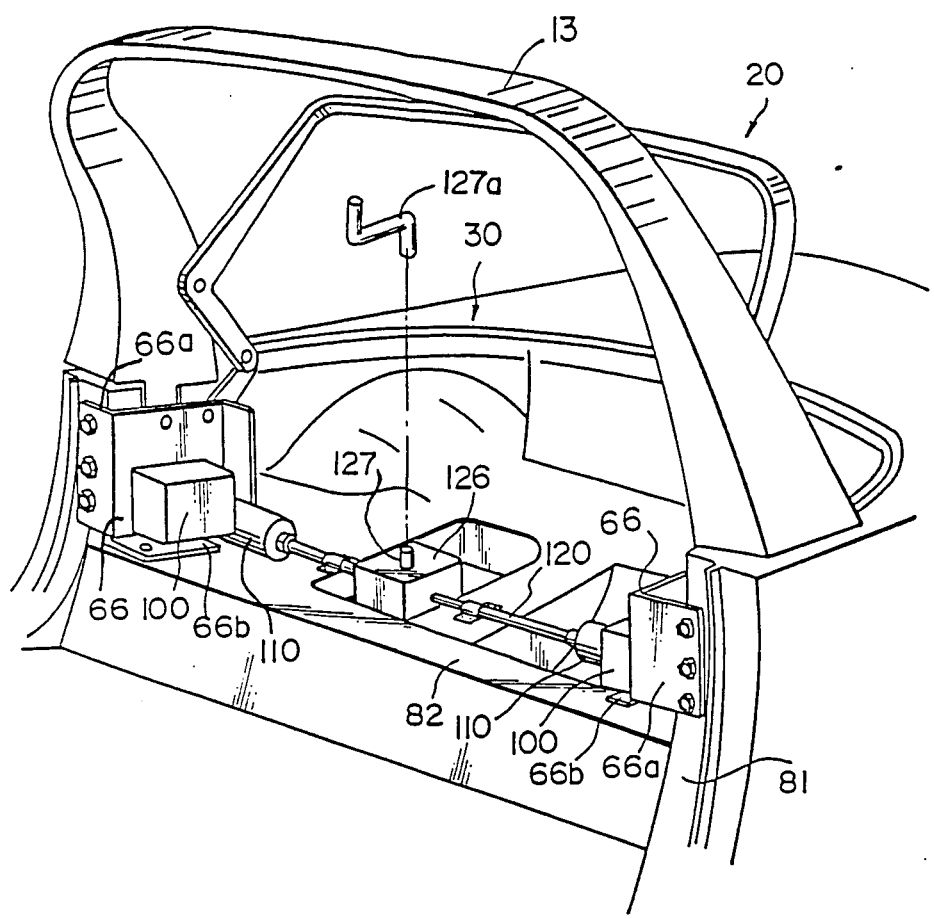
FIG. 10A is a perspective view similar to FIG. 8 but showing another embodiment.
Figure 10B:
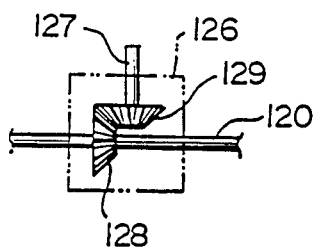
FIG. 10B is a view showing the detail of the manual operating mechanism in the embodiment shown in FIG. 10A.

Referring to FIGS. 10A and 10B, the embodiment shown therein has a manually actuating gear box 126 which includes a bevel gear 128 secured to the connecting rod 120. A bevel gear 129 is in meshing engagement with the bevel gear 128 and has a handle shaft 127 extending upward from the bevel gear 129. A crank handle 127a is provided for removable engagement with the shaft 127 so that the rod 120 can be manually rotated by means of the crank handle 127a.

Figure 11:
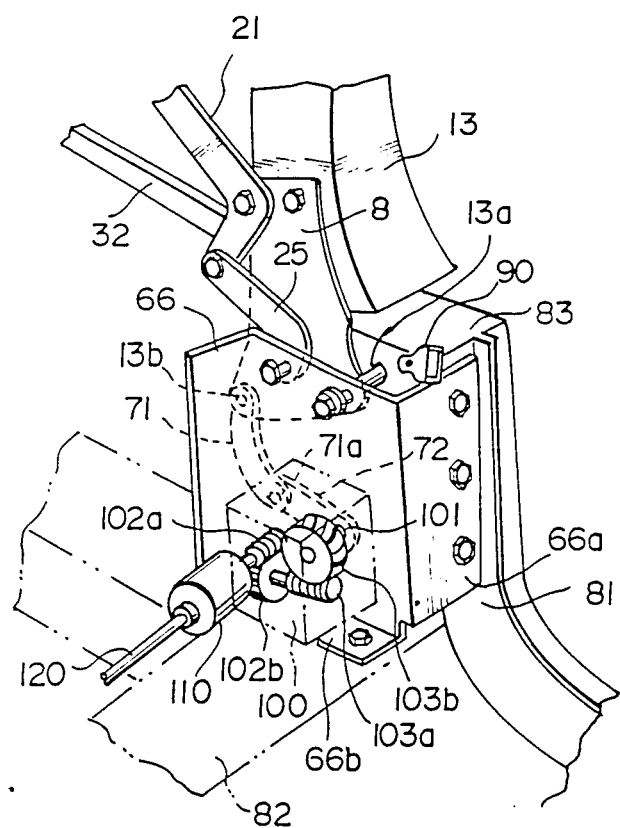
FIG. 11 is a perspective view showing details of the gear box in the embodiment shown in FIG. 8.
Figure 12:
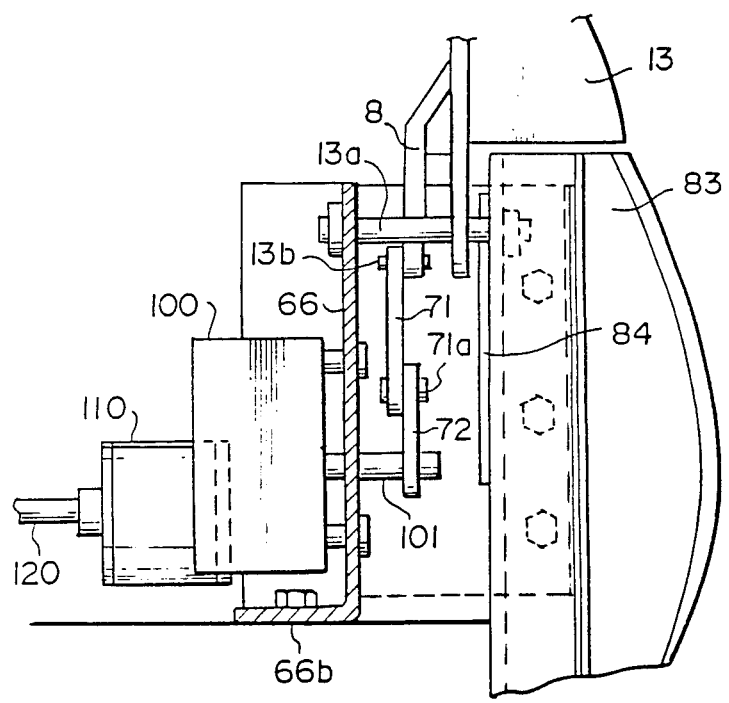
FIG. 12 is a front view of the mechanism shown in FIG. 11.

Referring now to FIGS. 11 and 12, the rear body section 17 includes a rear side pillar 83 having a front edge portion 81 defining a side door opening. Further, the rear body section 17 has a floor panel 82. It will be noted that the bracket 66 supporting the gear box 100 and the motor 110 has a front edge portion 66a bent transversely outward and secured to the front edge portion 81 of the rear side pillar 83. The bracket 66 further has a lower edge portion 66b secured to the floor panel 32. As already described, the pivot shaft 13a for pivotably mounting the pillar 1 on the rear body section 17 is bridged between the bracket 66 and the plates 8 and 9. Thus, a rigid support for the pillar 13 can be provided.

FIG. 11 shows an example of gear box 100. In this example, the gear box 100 includes a worm assembly comprising a worm 102a secured to the output shaft of the motor 110 and a worm wheel 102b meshing with the worm 102a. A second worm 103a is provided concentrically and integrally with the worm wheel 102b and a worm wheel 103b having the output shaft 101 meshing with the worm 103a.

Figure 13:
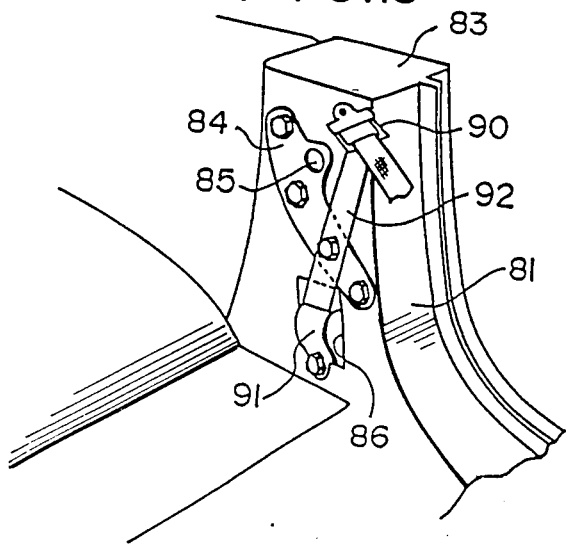
FIG. 13 is a perspective view showing the rear pillar of the vehicle body.

Referring to FIG. 13, the embodiment shown therein has a seat belt anchor 90 mounted on the upper end portion of the rear side pillar 83. The pillar 83 is formed at the inner panel with an opening 86 wherein a seat belt retraction 91 is disposed. A seat belt 92 extends from the retractor 91 through the anchor 90 into the passenger compartment. In order to reinforce the pillar 83, there is provided a reinforcing plate 84 attached to the inner panel of the pillar 83. The reinforcing plate 84 is formed with a hole 85 in which the pivot shaft 13a is received. Thus, the reinforcing plate 84 serves to strengthen the mount for the swingable pillar 13.

Figure 14:
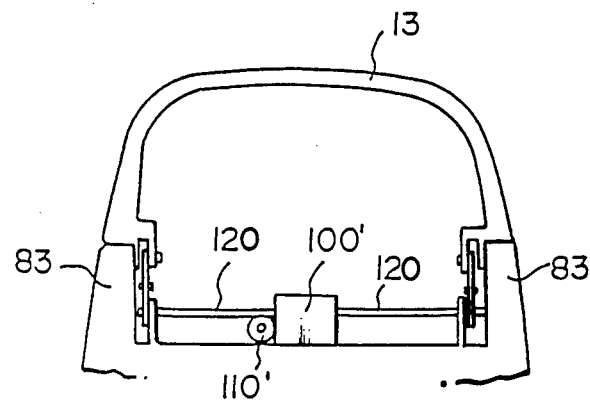
FIG. 14 is a front view showing another embodiment of the present invention; and, FIG. 15 is a perspective view showing a further embodiment.

FIG. 14 shows a further embodiment of the present invention. In this embodiment, a gear box 100' is provided in the intermediate portion of the connecting rod 120. The gear box 100' is connected with a motor 110' to be driven thereby.

Figure 15:
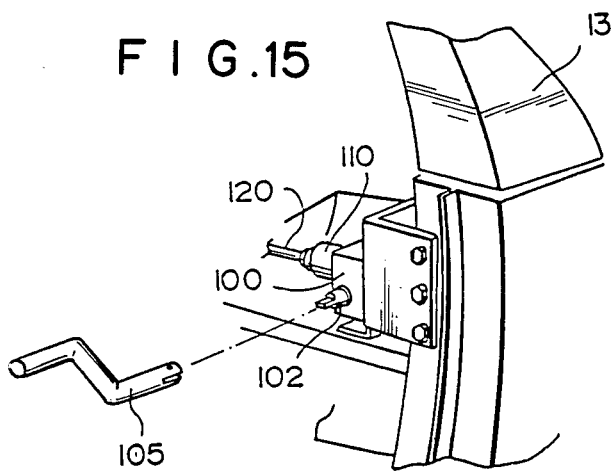

Referring to FIG. 15, the embodiment shown therein has a handle shaft 102 projecting from the gear box 100 provided at each side of the rear body section. A removable crank handle 105 is provided for manual actuation of the handle shaft 102. Driving motors may not necessarily be provided.

The invention has thus been shown and described with reference to specific embodiments, however, it should be noted that the invention is in no way limited to the details of the illustrated structures but changes and modifications may be made without departing from the scope of the appended claims.

We claim:

1. An open-top vehicle body structure including a body section, foldable hood means adapted to cover at least a part of the body section, link means for supporting said hood means, said link means being movable between an extending position wherein the link means supports the hood means in an extended position and a retracted position wherein the link means allows the hood means to be folded, first operating means provided at one side portion of the body section for moving the link means at one side between the extending position and the retracted position, second operating means provided at the other side portion of the body section for moving the link means at the other side between the extending position and the retracted position, said link means including a swingable pillar of an inverted U-shape having opposite leg portions mounted on the body section for swinging movement about a transversely extending horizontal axis, said hood means being connected at a front edge portion to said swingable pillar and at a rear edge portion to a part of said body section located rearwardly of said swingable pillar, a rigid roof panel being removably mounted between said swingable pillar and a front windshield structure, each of said first and second operating means including reversible motor means and a linkage connecting said motor means with said leg portion of the swingable pillar for converting a rotation of said motor means into a swingable movement of said pillar means, said linkage including a first link having one end pivotably connected with said leg portion of the swingable pillar, and a second link having one end pivotably connected with the other end of the first link, the other end of the second link being connected with an output shaft of said motor means.

2. An open-top vehicle body structure in accordance with claim 1 further comprising synchronizing means for synchronizing operations of said first and second operating means and in which each of said first and second operating means includes reversible motor means.

3. An open-top vehicle body structure in accordance with claim 2 in which said synchronizing means includes connecting means for mechanically connecting output shafts of the reversible motor means in said first and second operating means.

4. An open-top vehicle body structure in accordance with claim 3 in which said connecting means includes a rod member.

5. An open-top vehicle body structure in accordance with claim 3 in which said connecting means is provided with manually actuatable means.

6. An open-top vehicle body structure in accordance with claim 5 in which said manually actuatable means includes gear means connected with said connecting means and a manual handle for rotating an input element of said gear means.

7. An open-top vehicle body structure in accordance with claim 1 further comprising synchronizing means for synchronizing operations of said first and second operating means and in which each of said first and second operating means includes an input rotatable member and means for transmitting a rotation of said rotatable member to said link means.

8. An open-top vehicle body structure in accordance with claim 7 in which said synchronizing means includes connecting means for mechanically connecting together said input rotatable members in said first and second operating means.

9. An open-top vehicle body structure in accordance with claim 8 which further includes reversible motor means for driving said connecting means.

* * * * *